United States Patent
Mori et al.

(10) Patent No.: US 7,395,679 B2
(45) Date of Patent: Jul. 8, 2008

(54) METHOD OF MANUFACTURING GLASS SUBSTRATE FOR INFORMATION RECORDING MEDIUM

(75) Inventors: Toshiharu Mori, Settsu (JP); Yousuke Yamaguchi, Minamikawachi-gun (JP); Shinji Sakai, Kawanishi (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 396 days.

(21) Appl. No.: 11/079,596

(22) Filed: Mar. 14, 2005

(65) Prior Publication Data

US 2005/0204777 A1     Sep. 22, 2005

(30) Foreign Application Priority Data

Mar. 19, 2004  (JP) .............................. 2004-080069
Mar. 19, 2004  (JP) .............................. 2004-080080

(51) Int. Cl.
C03B 11/00   (2006.01)
C03B 21/00   (2006.01)
C03C 19/00   (2006.01)

(52) U.S. Cl. ....................... 65/66; 65/61; 65/65; 65/112
(58) Field of Classification Search ..................... 65/61, 65/70, 112, 113, 166; 360/135; 428/64.2, 428/64.4
See application file for complete search history.

(56) References Cited

U.S. PATENT DOCUMENTS 5,186,976 A * 2/1993 Kubo et al. .................. 427/129

(Continued)

FOREIGN PATENT DOCUMENTS

JP   2000-109330 A   4/2000
JP   2003-137577 A   5/2003

OTHER PUBLICATIONS

JP 2003137577 (Ogino Kazuo) May 14, 2003. [online] Retrieved May 31, 2008 from JPO PAJ Database:<url:http://www.19.ipdl.inpit.go.jp/PA1/cgi-bin/PA1NUMBER>.*

(Continued)

*Primary Examiner*—Steven P. Griffin
*Assistant Examiner*—DeMaris R. Wilson
(74) *Attorney, Agent, or Firm*—Sidley Austin LLP

(57) ABSTRACT

Molten glass is press-molded by a metallic die in which a cylindrical body is provided in a vertically standing manner at a central part of a bottom surface of a bottomed hole and a molding surface corresponding to a chamfering shape of an outer peripheral edge surface of a glass substrate is consecutively formed in an inner peripheral wall, and a glass substrate precursor provided with the chamfering shape axially consecutive on an outer peripheral surface thereof and a through hole formed at a central part thereof is thereby formed. The glass substrate precursor is cut perpendicular to an axial direction to be separated into respective glass substrates. Next, the respective glass substrates are subjected to a lapping process and a polishing process, if necessary, to produce a glass substrate as a final product. According to the manufacturing method, a glass substrate for information recording medium whose inner and outer peripheral edge surfaces are chamfered can be manufactured with an improved efficiency. Further, a glass substrate having a small diameter can be manufactured with a high efficiency.

8 Claims, 14 Drawing Sheets

U.S. PATENT DOCUMENTS

| | | | |
|---|---|---|---|
| 5,779,753 A * | 7/1998 | Vetter et al. | 65/105 |
| 5,785,729 A * | 7/1998 | Yokokawa et al. | 65/385 |
| 6,096,405 A * | 8/2000 | Takahashi et al. | 428/141 |
| 6,615,613 B1 * | 9/2003 | Iwabuchi et al. | 65/61 |
| 6,845,635 B2 * | 1/2005 | Watanabe et al. | 65/30.14 |
| 7,065,984 B2 * | 6/2006 | Kezuka et al. | 65/61 |
| 7,140,203 B2 * | 11/2006 | Saito et al. | 65/30.14 |
| 2003/0134734 A1 | 7/2003 | Nishimoto et al. | 501/69 |
| 2003/0205060 A1 * | 11/2003 | Iwabuchi et al. | 65/61 |

OTHER PUBLICATIONS

JP 2000109330 (Kaneda Yasushi) Apr. 18, 2000. [online] Retrieved May 31, 2008 from JPO PAJ Database:<url:http://www.19.ipdl.inpit.go.jp/PA1/cgi-bin/PA1NUMBER>.*

Japanese "Notification of Reasons for Refusal", dated Feb. 5, 2008, for counterpart Japanese Patent Application No. 2004-080069, along with an English-translation thereof.

* cited by examiner

PRIOR ART

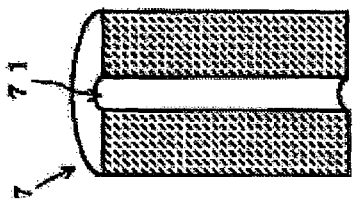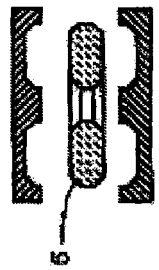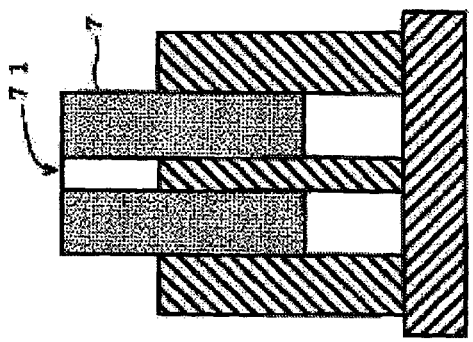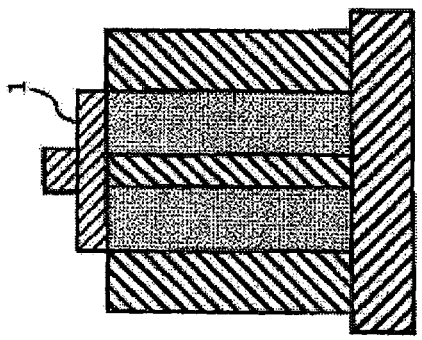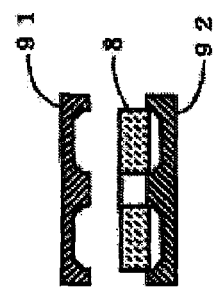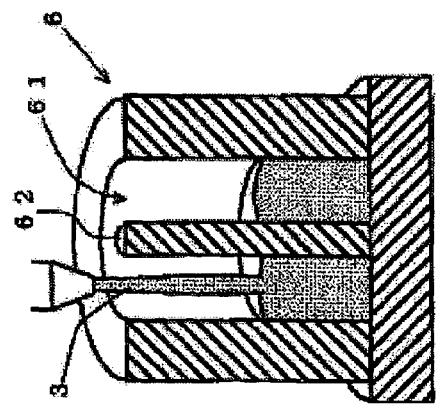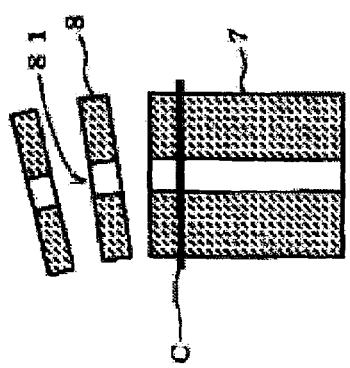

METHOD OF MANUFACTURING GLASS SUBSTRATE FOR INFORMATION RECORDING MEDIUM

The present application claims priority to Japanese Patent Application No. 2004-80069 and No. 2004-80080 filed Mar. 19, 2004, the entire contents of which are hereby incorporated by reference.

BACKGROUND OF THE INVENTION

1. Field of the Invention

The present invention relates to a method of manufacturing a glass substrate for an information recording medium (hereinafter, may simply referred to as "glass substrate"), in which at least one of an inner peripheral edge surface and an outer peripheral edge surface has a chamfered shape.

2. Description of the Related Art

A generally called "hard disk" is used as an information recording medium capable of writing and reading a large volume of information at a high speed, and as a substrate used of the hard disk, a glass substrate superior in evenness, hardness and the like has been more often used in recent years in place of a conventional aluminum substrate. FIG. 1 shows respective steps in a conventional method of manufacturing the glass substrate (for example, U.S. Publication 2003/0134734).

First, a glass material is melted (glass melting step), and the molten glass is cast into a lower die and pressed by an upper die to be molded (press-molding step). In the press-molding step, a method shown in FIG. 2 is generally adopted. As shown in FIGS. 2(a)-(c), molten glass 3 is press-molded in a predetermined thickness by an upper die 11 and a lower die 12 comprising a molding surface having a plane shape. For reference, an outer diameter regulating frame having a ring shape for regulating an outer diameter of the glass substrate may be interposed between the upper die and the lower die so as to regulate an outer diameter of a molded glass substrate precursor 13.

The press-molded glass substrate precursor 13 is crystallized or annealed and cooled down (crystallizing step or annealing step). In the cooled-down glass substrate precursor 13, a hole is formed at a central part thereof, if necessary, by a core drill or the like (coring step). Then, in a first lapping step, both surfaces of the glass substrate are lapped so that a general shape of the glass substrate, that is parallelism, flatness, and thickness of the glass substrate, is preliminarily adjusted. Next, an outer peripheral edge surface and an inner peripheral edge surface of the glass substrate are ground and chamfered so that a dimension of the outer diameter and circularity of the glass substrate, a dimension of an inner diameter of the hole, and concentricity between the glass substrate and the hole (inner/outer diameter high-precision processing step) are fine-adjusted. After that, the outer and inner peripheral edge surfaces of the glass substrate are polished so as to remove fine flaws and the like thereon (periphery edge surface polishing step). Next, both surfaces of the glass substrate are lapped again so that the parallelism, flatness and thickness of the glass substrate are fine-adjusted (second lapping process). Then, the both surfaces of the glass substrate are polished so as to remove any undulation on the surfaces (polishing step). The both surfaces of the glass substrate are further polished, if necessary, by an abrasive material having a different grain size (second polishing step). Finally, the glass substrate is washed and examined, and shipped as a glass substrate for hard disk.

As described, according to the conventionally employed method, for example, the two steps, which are the lapping/polishing step and the polishing step, are required for processing the inner and outer peripheral surfaces. As a result, the manufacturing steps are increased, which complicates the overall process and deteriorates a manufacturing efficiency. Further, devices in which the hard disk substrate is installed are increasingly reduced in size and weight, in response to which the diameter of the glass substrate is also being reduced. In order to manufacture the glass substrate having a reduced diameter, however, it is necessary to downsize manufacturing jigs used in the process in comparison to the conventional method, for example, reducing a diameter of the core drill for forming the central hole, as a result of which the work process is complicated. Therefore, the manufacturing efficiency unavoidably deteriorates in the conventional manufacturing method.

SUMMARY OF THE INVENTION

Therefore, a main object of the present invention is to reduce the number of manufacturing steps to thereby efficiently manufacture a glass substrate having a small diameter.

Another object of the present invention is to reduce the number of the manufacturing steps to thereby efficiently manufacture the glass substrate having a small diameter in a method of manufacturing a glass substrate for an information recording medium in which a central hole is provided and inner and outer peripheral edge surfaces have a chamfered shape.

The inventors of the present invention committed themselves to examining various methods in order to achieve the foregoing objects, and learnt that a dimension of an object molded by metallic dies is highly precise, and a surface of the object molded by the metallic dies has a quality substantially equal to or exceeding a surface quality obtained by polishing and finally led to the present invention based on the idea that the shape is preferably rendered as approximate as possible to a final shape by the press molding.

More specifically, according to an aspect of the present invention, a method of manufacturing a glass substrate for information recording medium comprises a step wherein, molten glass is press-molded by a metallic die in which a cylindrical body is provided in a vertically standing manner at a central part of a bottom surface of a bottomed hole and a molding surface corresponding to a chamfered shape of the outer peripheral edge surface of the glass substrate is consecutively formed in an inner peripheral wall, and a glass substrate precursor provided with the chamfered shape axially consecutive on an outer peripheral surface thereof and a through hole formed at a central part thereof is thereby formed, and a step wherein the glass substrate precursor is cut perpendicular to an axial direction to be divided into respective glass substrates.

According to the foregoing method, the outer peripheral edge surface has the chamfered shape as a result of the press molding. Therefore, the number of the manufacturing steps can be lessened in comparison to the conventional manufacturing method in which the chamfered shape was obtained through polishing. Further, the glass substrate precursor having a shape in which the glass substrates are stacked on one another is molded in the press molding, and thereafter cut to be cut into the respective glass substrates, which improves the manufacturing efficiency in contrast to the conventional technology.

According to another aspect of the present invention, a method of manufacturing a glass substrate for information recording medium is characterized in comprising a step wherein molten glass is press-molded by a metallic die in which a cylindrical body is provided in a vertically standing manner at a central part of a bottom surface of a hole having a cylindrical shape, and a molded body having a cylindrical shape and provided with a through hole at a central part thereof is thereby formed, a step wherein the cylindrical molded body is cut perpendicular to an axial direction to be divided into preforms having a predetermined thickness, and a step wherein the preform is disposed in a metallic die in which a molding surface in contact with an outer peripheral edge surface and an inner peripheral edge surface of the preform has a chamfered shape to be heat-molded.

According to the foregoing manufacturing method, the preform provided with the hole, which could not be conventionally produced, can be produced by thinly cutting the cylindrical molded body, and the preform can have a final shape by a so-called reheating step. Therefore, the manufacturing steps such as lapping and polishing, which were conventionally demanded, are no longer necessary, which largely improves the manufacturing efficiency.

According to still another aspect of the present invention, a method of manufacturing a glass substrate for an information recording medium in which an outer peripheral edge surface and/or an inner peripheral edge surface has a chamfered shape comprises a step wherein a pair of metallic dies in which protruding parts corresponding to the chamfered shape and having a wedge shape in section are formed so as to be circumferentially opposed to each other is used to press-mold molten glass and a glass substrate precursor circumferentially provided with grooves having a substantially V-letter shape on both surfaces thereof is thereby formed and a step wherein an outer peripheral section outside of the grooves having the substantially V-letter shape is cut.

According to the foregoing manufacturing method, the outer peripheral edge surface and/or the inner peripheral edge surface of the glass substrate can have the chamfered shape through the press molding, which eliminates the coring step and the inner/outer diameter high-precision processing step demanded in the conventional technology and thereby improves the manufacturing efficiency.

According to still another aspect of the present invention, a method of manufacturing a glass substrate for information recording medium in which an outer peripheral edge surface and/or an inner peripheral edge surface has the chamfered shape comprises a step wherein a pair of metallic dies in which protruding parts corresponding to the chamfered shape and having a wedge shape in section are formed in one of the metallic dies is used to press-mold molten glass and a glass substrate precursor circumferentially provided with grooves having a substantially V-letter shape on one of surfaces thereof is thereby formed, a step wherein the grooves having the substantially V-letter shape are cut so that one of the outer peripheral edge surface and/or the inner peripheral edge surface has the chamfered shape, and a step wherein the other of the outer peripheral edge surface and/or the inner peripheral edge surface not having the chamfered shape is heated and pressed by a metallic die having a molding surface corresponding to the chamfered shape so that the other of the peripheral edge surface and/or the inner outer peripheral edge surface not having the chamfered shape can also have the chamfered shape.

According to the foregoing method, the coring step and the inner/outer diameter high-precision processing step can be omitted, as a result of which the manufacturing efficiency can be improved.

The invention itself, together with further objects and attendant advantages, will best be understood by reference to the following detailed description taken in conjunction with the accompanying drawings.

BRIEF DESCRIPTION OF THE DRAWINGS

FIGS. 6(a)-(h) are schematic views of press molding and reheating molding according to the second embodiment;

In the following description, like parts are designated by like reference numbers throughout the several drawings.

DETAILED DESCRIPTION OF THE PREFERRED EMBODIMENTS

Figure 1:
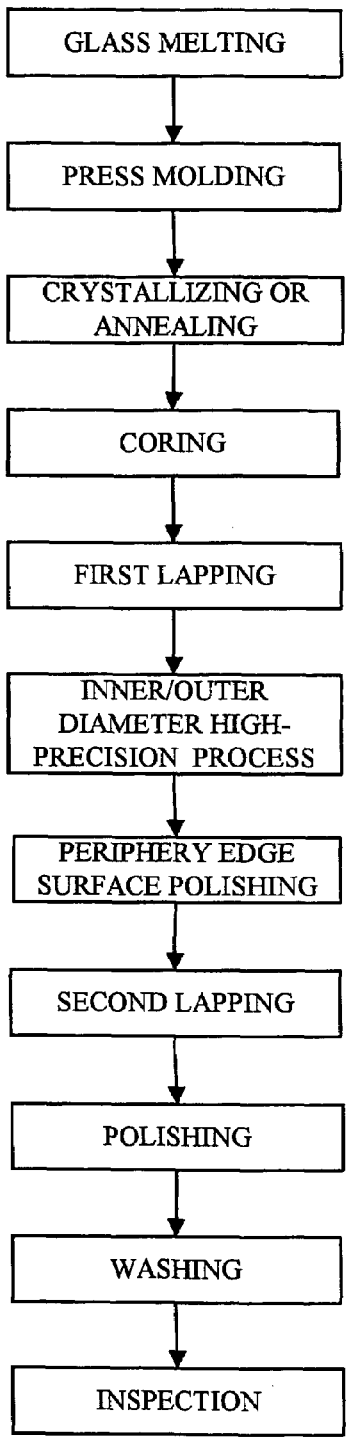
FIG. 1 is a flow chart of a conventional manufacturing method.
Figure 2A:
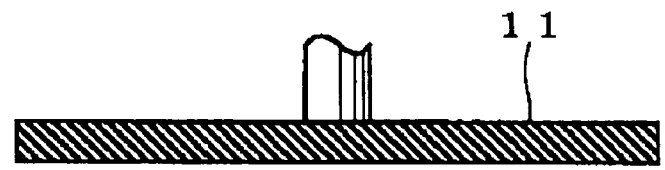
FIGS. 2(a)-(c) are schematic views of a conventional press molding.
Figure 2B:
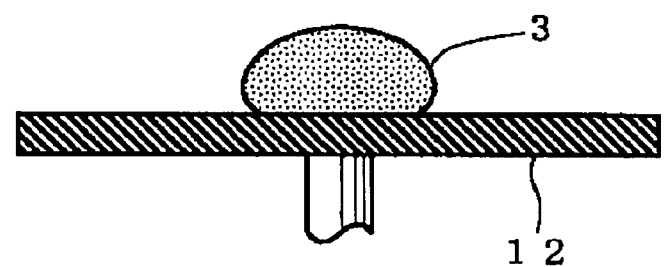
Figure 2C:
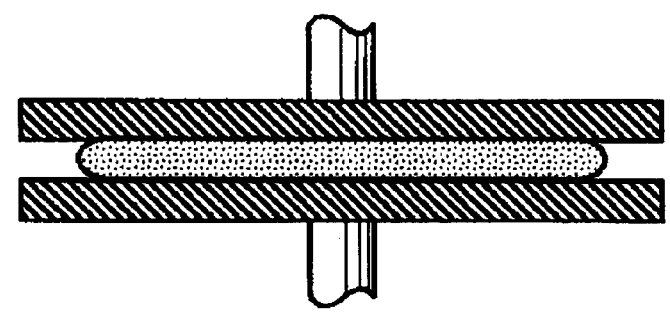

Hereinafter, a method of manufacturing a glass substrate according to the present invention is described referring to the drawings though the present invention is not limited to embodiments described below.

First Embodiment

Figure 3:
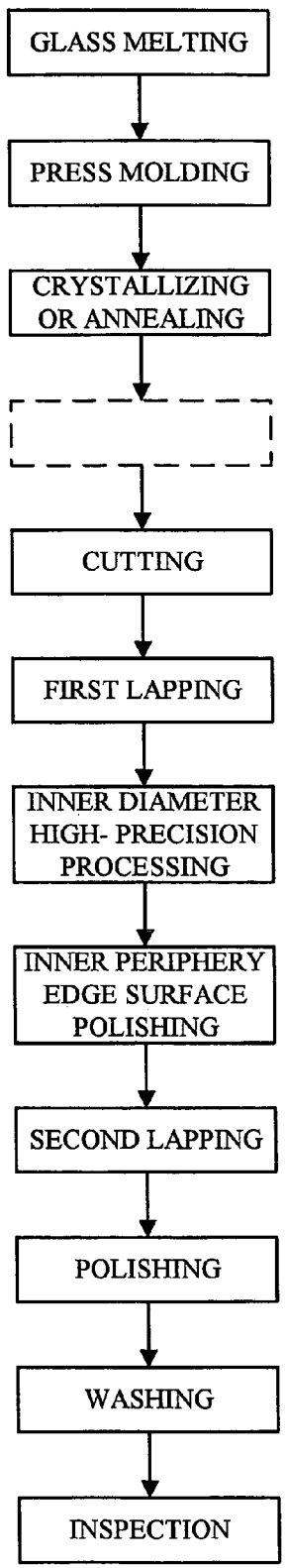
FIG. 3 is a flow chart of a manufacturing method according to a first embodiment of the present invention.
Figure 4A:
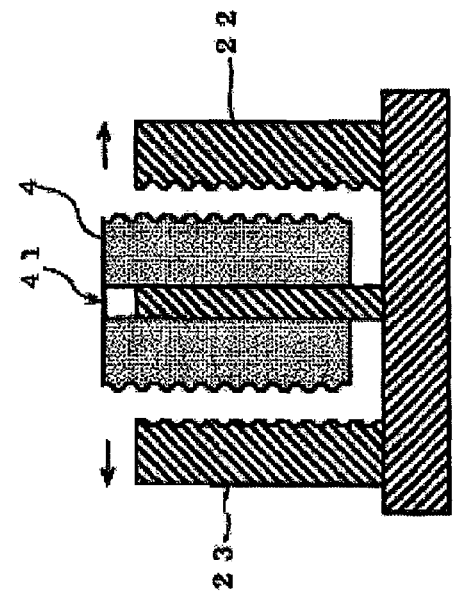
FIGS. 4(a)-(e) are schematic views of press molding according to the first embodiment.
Figure 4B:
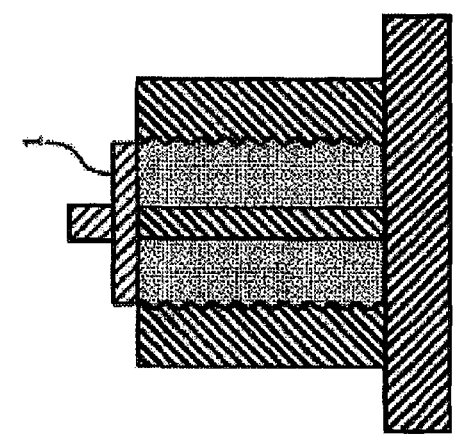
Figure 4C:
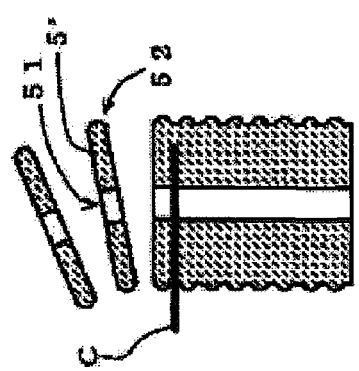
Figure 4D:
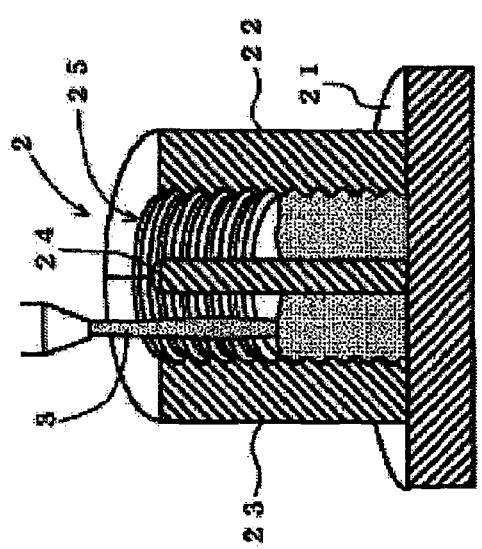
Figure 4E:
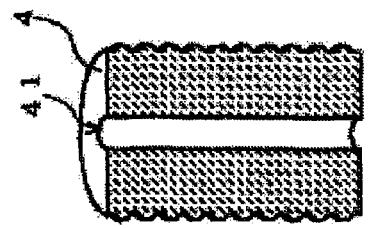
Figure 5:
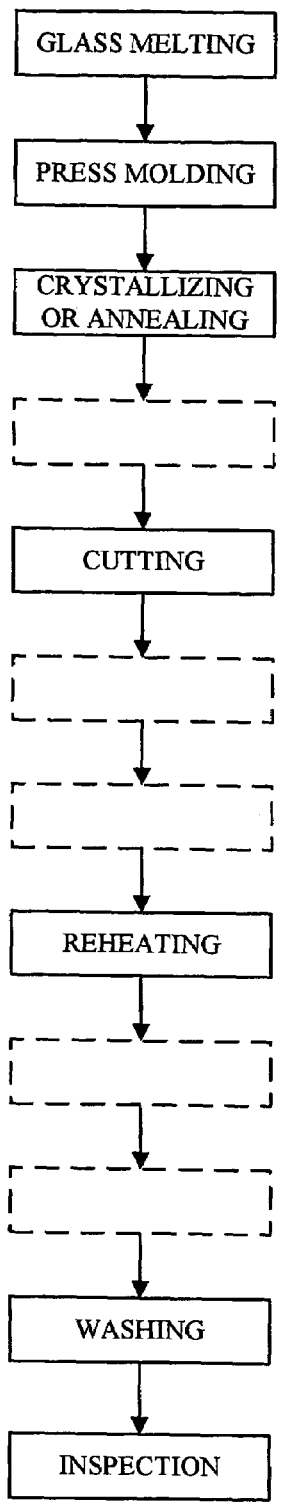
FIG. 5 is a flow chart of a manufacturing method according to a second embodiment of the present invention.
Figure 7:
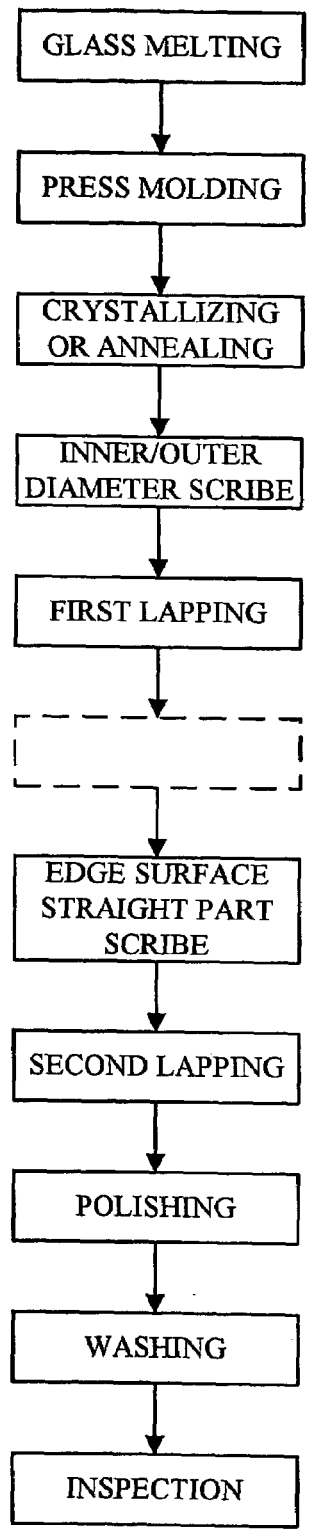
FIG. 7 is a flow chart of a manufacturing method according to a third embodiment of the present invention.
Figure 11:
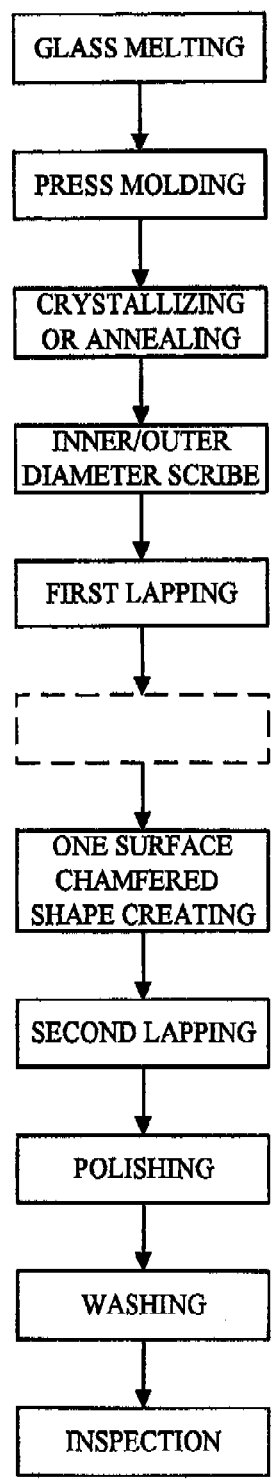
FIG. 11 is a flow chart of a manufacturing method according to a fourth embodiment of the present invention.

FIG. 3 is a flow chart of a method of manufacturing a glass substrate according to a first embodiment, wherein any step which is included in the conventional manufacturing method but can be omitted in the present embodiment is shown in a broken line (which is also applied to FIGS. 5, 7 and 11).

First, a glass material is melted (glass melting step). There is no particular limitation to the glass material used here. Any of glass materials such as lithium.aluminosilicate-based glass, magnesium.aluminosilicate-based glass, borosilicate-based glass and the like can be appropriately selected depending on a desired form of the glass substrate to be obtained (crystalline glass or amorphous glass).

Next, a certain amount of the molten glass is dropped or cast into a lower die and pressed by an upper die to be press-molded (press molding step). As shown in FIG. 4, a lower die 2 comprises a base part 21 having a flat plate shape, side parts 22 and 23 mounted on an upper surface of the base part 21, and a cylindrical body 24 provided in a vertically standing manner on the upper surface of the base part 21 coaxially with a through hole 25 formed by the side parts 22 and 23. On an inner peripheral wall of the through hole 25, a molding surface corresponding to a chamfered shape on an outer peripheral edge surface of the glass substrate is consecutively, axially formed. The right side part 22 and the left side part 23 constituting the side parts can be respectively moved in left and right directions in the drawing.

As shown in FIG. 4(*a*), a bottomed hole is formed by the through hole 25 and the base part 21 serving as a bottom part of the through hole, and molten glass 3 is cast into the bottomed hole. After the molten glass is pressed by an upper die 1 which can be fitted to the bottomed hole (FIG. 4(*b*)), the right side part 22 and the left side part 23 are respectively moved in the left and right directions, and a glass substrate precursor 4 in which the chamfered shape is axially consecutive on an outer peripheral surface and a through hole 41 is formed at a central part is removed (FIG. 4(*c*)).

There is no particular limitation to the chamfered shape formed in the foregoing manner, which can be appropriately determined depending on a method of use of the glass substrate. However, in general, an angle of a tilting surface of the chamfered shape is preferably in the range of 30 to 60 degrees, and a width in a thickness direction thereof is preferably in the range of ¼ to ⅓ relative to a thickness of the glass substrate. Further, in terms of the manufacturing efficiency and molding property, the glass substrate precursor 4 is preferably approximately as thick as 10 to 20 glass substrates stacked on one another. Conditions for the press molding can be the same as the molding conditions employed in the conventional manufacturing method can be adopted. For example, it is recommended that a pressure in the press be 20 to 100 kg/cm2 and a length of time for the press be in the range of 0.3 to 2.0 sec.

Next, as shown FIG. 3 and FIG. 4(*d*), the press-molded glass substrate precursor 4 is crystallized or annealed. Whether it is crystallized or annealed depends on the form of the glass substrate to be obtained (crystalline or amorphous), meaning that the crystallization process is selected when the crystalline glass substrate is desirably obtained, and the annealing process is selected when the amorphous glass substrate is desirably obtained.

Methods employed for the crystallization process and the annealing process may conform to methods employed for the crystallization process and the annealing process in the conventional manufacturing method. For example, when the crystallization process is carried out, in general, the glass substrate precursor is heated in the range of (glass transition point Tg+50° C.)–(Tg+300° C.), kept at a constant temperature or slowly cooled down to near Tg while the temperature is being controlled, and thereafter releases its heat. When the heating temperature, a length of time for keeping the constant temperature, a cooling speed to reach Tg and the like are appropriately selected, various physical properties of the glass substrate such as coefficient of thermal expansion, Young's modulus and crystallinity can be adjusted. On the other hand, when the annealing process is carried out, in general, the glass substrate precursor is kept at near Tg for a certain period of time, then cooled down at a relatively low cooling speed to a strain point, and thereafter cooled down at a relatively high cooling speed.

Next, as shown in FIG. 4(*e*), the glass substrate precursor 4 is cut in a predetermined thickness by a diamond cutter C to be divided into glass substrates 5'. The glass substrate 5' is provided with a central hole 51 and an outer peripheral edge surface 52 has the chamfered shape as a result of the press molding. Therefore, the coring step, outer diameter high-precision processing step and edge surface polishing step, which were conventionally demanded (both are shown in FIG. 1), can be omitted in the manufacturing method according to the present embodiment. As a result, manufacturing efficiency is remarkably improved. A thickness of the glass substrate 5' to be cut can be appropriately determined in consideration of the method of use of the glass substrate and if the polishing process is thereafter further implemented, and a preferable range thereof is generally 0.1 to 1.0 mm. Examples of the cutting process can obviously include a laser cutting process, a water jet cutting process and the like.

Referring to FIG. 3 again, a first lapping treatment is implemented to the glass substrate 5', which is cut off and separated from the glass substrate precursor 4. In the first lapping treatment, the both surfaces of the glass substrate are polished and thereby preliminarily adjusted to obtain a predetermined parallelism, flatness and thickness. There is no particular limitation to conditions for the lapping treatment, and conditions employed in the publicly known manufacturing method can be adopted. A grain size of an abrasive material used is in the range of #600 to #2000, and a fixed abrasive grain (diamond pellet) or a free abrasive grain (slurry such as alumina or silicon carbide) in the range of #800 to #2000 can be preferably used. A conventional lapping device can be used as a lapping device in the present embodiment, a preferable example of which is a both-surface lapping device manufactured by HAMAI INDUSTRIES LTD. and SPEEDFAM CO., LTD.

a next step, the inner peripheral edge surface of the glass substrate, which does not have the chamfered shape though it is formed by the press molding, is ground to have the chamfered shape. Then, an inner diameter dimension of the central hole of the glass substrate and a concentricity between the glass substrate and the hole are fine-adjusted (inner diameter high-precision processing step), and the inner peripheral edge surface of the glass substrate is polished to remove fine flaws and the like thereon (edge surface polishing step). A publicly known polishing process employed in the conventional technology can be used as a method of the polishing process in the present embodiment. For example, a cut surface of a main body section is ground by an abrasive material such as cerium oxide having an averaged first particle diameter of 2 □m or below so as to have a surface roughness (Ra) of 1 nm or below or preferably 0.5 nm or below, and a maximum surface roughness (Rmax) of 20 nm or below or preferably 10 nm or below. The surface roughness (Ra) and the maximum surface roughness (Rmax) are respectively an average value and a maximum value based on JIS B060 1. Next, the both surfaces of the glass substrate are lapped to correct a shape precision of the surfaces (second lapping step), wherein a final shape quality (parallelism, flatness and thickness) required for the glass substrate is achieved, and the surface roughness and the maximum surface roughness adjustable in the following polishing process are also achieved. Conditions for the second lapping treatment and a device used therein can be the same as those exemplified in the first lapping treatment.

After the second lapping treatment is completed, the polishing process is carried out, that is to polish the both surfaces of the glass substrate to adjust an evenness. A publicly known method can be used as a method of the polishing treatment in the present embodiment, an example of which is the method and conditions exemplified in the before-mentioned polishing treatment of the inner peripheral edge surface. A publicly known device can be used as a device for the polishing treatment, an example of which is a both-surface polishing board (HAMAI INDUSTRIES LTD.)

Finally, the polished glass substrate is washed and examined. In the washing step, the glass substrate is left in running water of normal temperature so as to remove any waste glass attached to the surfaces of the glass substrate. In the inspection step, it is examined if the parallelism, flatness, thickness, surface roughness, maximum surface roughness, concentricity, circularity, edge-part shape (roll-off), minute undulation and the like of the glass substrate are in respective desired ranges, and handled as a glass substrate to be shipped as an end product.

Second Embodiment

Next, a manufacturing method according to a second embodiment of the present invention is described. The manufacturing method according to the present embodiment is characterized in that a molded body having a cylindrical shape which is manufactured by the press molding is thinly cut to be formed into preforms having a central hole, and the preform is formed into a glass substrate in a final form by a so-called reheating method.

FIG. 5 shows a flow chart of an example of the manufacturing method according to the second embodiment. The description below is focused on steps which differ from the steps of the manufacturing method according to the previous embodiment. A glass material is melted (glass melting step), and the molten glass is press-molded by metallic dies for molding. As shown in FIG. 6, in the press-molding step of the manufacturing method according to the present embodiment, a certain amount of the molten glass 3 is dropped or cast into a lower die 6 in which a cylindrical body 62 is provided in the vertically standing manner at a central part of a bottom surface of a hole 61 having a cylindrical shape (FIG. 6(a)), and the molten glass 3 is pressed by an upper die 1 which can be fitted to the hole 61 to be thereby press-molded (FIG. 6(b)). Then, the molten glass 3 is molded into a molded body 7 having a cylindrical shape in which a through hole 71 is formed at a central part (FIG. 6(c)). In terms of the manufacturing efficiency and the molding property, a height of the cylindrical molded body 7 preferably corresponds to a thickness made by approximately 10 to 20 glass substrates stacked on one another. Conditions for the press molding conforming to the molding conditions in the conventional manufacturing method can be employed in the present embodiment. For example, it is recommended that a pressure in the press be in the range of 20 to 100 kg/cm$^2$ and a length of time required for the press be in the range of 0.3 to 2.0 sec.

Next, as shown in FIG. 5 and FIG. 6(d), the formed cylindrical molded body 7 is crystallized or annealed. The choice between the crystallization and the annealing depends on the form of the glass substrate (crystalline or amorphous) to be obtained. More specifically, when it is desirable to obtain the crystalline glass substrate, the crystallization treatment is performed, while the annealing treatment is performed when it is desirable to obtain the amorphous glass substrate. Specific methods of the crystallization and the annealing can employ the methods described earlier.

Next, as shown in FIG. 6(e), the cylindrical molded body 7 is cut in a predetermined thickness by the diamond cutter C to be separate into preforms 8. In the foregoing manner, the preform 8 provided with a central hole 81, which could not be conventionally produced, can be produced, and a glass substrate having a central hole can be thereby produced by the reheating step described later. A thickness of the preform 8 to be cut can be appropriately determined depending on the size and the thickness of the glass substrate to be manufactured, and a preferable range thereof is generally 0.1 to 1.0 mm. Examples of the cutting process can obviously include the laser cutting process, water jet cutting process and the like.

The formed preform 8 is disposed between metallic dies 91 and 92 in which molding surfaces to make a contact with inner and outer peripheral edge surfaces of the preform 8 have the chamfered shape and the molding surfaces correspond to a final product shape (FIG. 6(f)). Then, the preform 8 is reheated and thereby softened, and also pressurized to be thereby formed into a glass substrate 5 having a predetermined shape (FIGS. 6(g) and (h)). As described earlier, a product molded using the metallic dies has a good dimension precision and a surface quality substantially equal to or superior to a surface obtained by polishing. Therefore, the glass substrate 5, which was reheated to be molded, can immediately serve as a final product after it is simply washed, meaning that the inner/outer diameter high-precision processing step, edge surface polishing step, lapping step, and polishing step (shown in FIG. 1), which were not conventionally demanded, are no longer necessary on principle. Accordingly, the manufacturing efficiency in the manufacturing method according to the present embodiment remarkably improves. The lapping treatment and the polishing treatment may be naturally performed if necessary. Specific methods of the lapping treatment and the polishing treatment can employ the methods described earlier Third Embodiment Next, a manufacturing method according to a third embodiment of the present invention is described.

FIG. 7 shows a flow chart of an example a method of manufacturing a glass substrate in which a central hole is provided and inner and outer peripheral edge surfaces have the chamfered shape. First, a glass material is melted (glass melting step). There is no particular limitation to the glass material used here, and any of the glass materials such as lithiumLilaluminosilicate-based glass, magnesium☐aluminosilicate-based glass, borosilicate-based glass and the like is appropriately selected depending on the desired form of the glass substrate to be obtained (crystalline glass or amorphous glass).

Figure 8A:
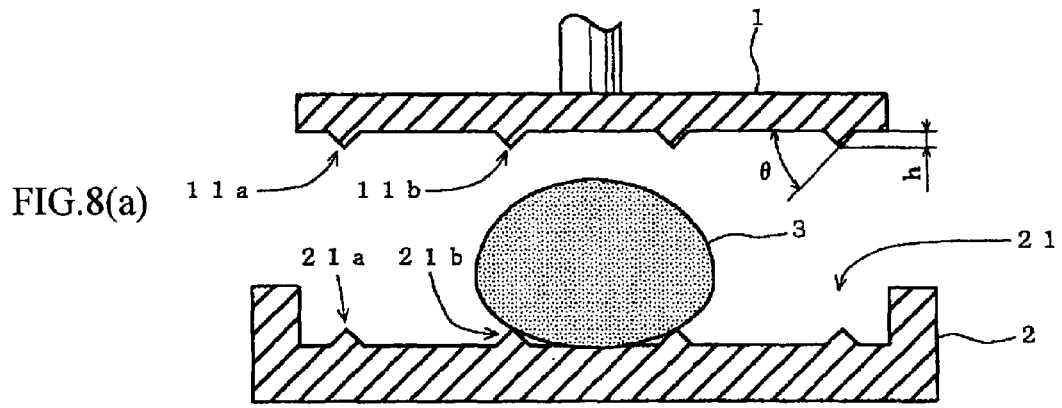
FIGS. 8 (a)-(c) are schematic views of press molding according to the third embodiment.
Figure 8B:
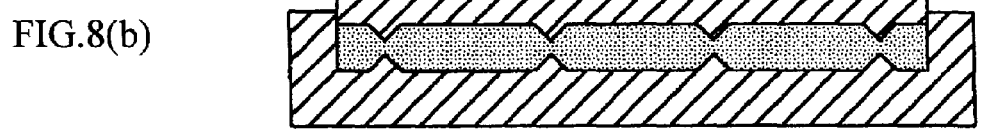
Figure 8C:
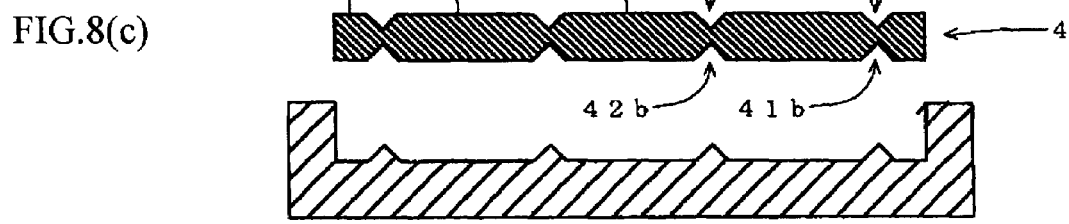

Next, a certain amount of the molten glass is dropped or cast into a lower die and pressed by an upper die to be press-molded (press molding step). As shown in FIG. 8, a circular recessed portion 21 is formed in a lower die 2, and two protruding parts 21a and 21b having a wedge shape in section are concentrically formed on a bottom surface of the recessed portion 21. An upper die 1 has a shape which can be fitted to the circular recessed portion 21 of the lower die 2 and is provided with two corresponding protruding parts 11a and 11b at positions opposing to the protruding parts 21a and 21b of the lower die 2. The molten glass 3 is press-molded by the lower die 2 and the upper die 1 constituted as described and thereby molded into a glass substrate precursor 4 in which two pairs of concentric grooves having a V-letter shape, 41a, 41b, 42a and 42b, are formed on both surfaces. Hereinafter, a part surround by the V-letter shape grooves 42a and 42b in the glass substrate precursor 4 is referred to as a central section 43, a part outside of the V-letter shape grooves 41a and 41b is referred to as an outer peripheral section 44, and a part between the V-letter shape grooves 41a and 42a is referred to as a main body section 45.

As described later, a shape of the protruding parts formed in the upper and the lower dies directly corresponds to the chamfered shape of the edge surface of the glass substrate. Therefore, an angle of a tilting surface☐shown in FIG. 8 is preferably in the range of 30 to 60 degrees, and a height h is preferably in the range of ¼ to ⅓ relative to a thickness of the glass substrate.

Conditions for the press molding in the present embodiment can be the same as the molding conditions in the conventional manufacturing method. For example, it is recommended that a pressure in the press be preferably in the range of 20 to 100 kg/cm$^2$ and a length of time required for the press be preferably in the range of 0.3 to 2.0 sec. The press molding employed in the present embodiment may be, of course, direct press or reheating press.

Next, as shown in FIG. 7, the press-molded glass substrate precursor is crystallized or annealed. Whether it is crystallized or annealed depends on the form of the glass substrate to be obtained (crystalline or amorphous), meaning that the crystallization process is selected when the crystalline glass substrate is desirably obtained, and the annealing process is selected when the amorphous glass substrate is desirably obtained.

Next, after notches are formed along the V-letter shape grooves by the diamond cutter or the like, an impact is rendered to the central section and the outer peripheral section by an impact body, and the central section and the outer peripheral section are cut off and removed from the main body section (inner/outer diameter scribe step in FIG. 7). The laser cutting process or the water jet cutting process may be employed as a method of cutting off and removing the central section and the outer peripheral section, however, the foregoing methods include such problems that it is difficult to cut off the foregoing parts exactly along the circumferential V-letter shape grooves and devices used for those methods are rather expensive. Therefore, it is recommended that the notches be formed to cut off those parts.

Figure 9A:
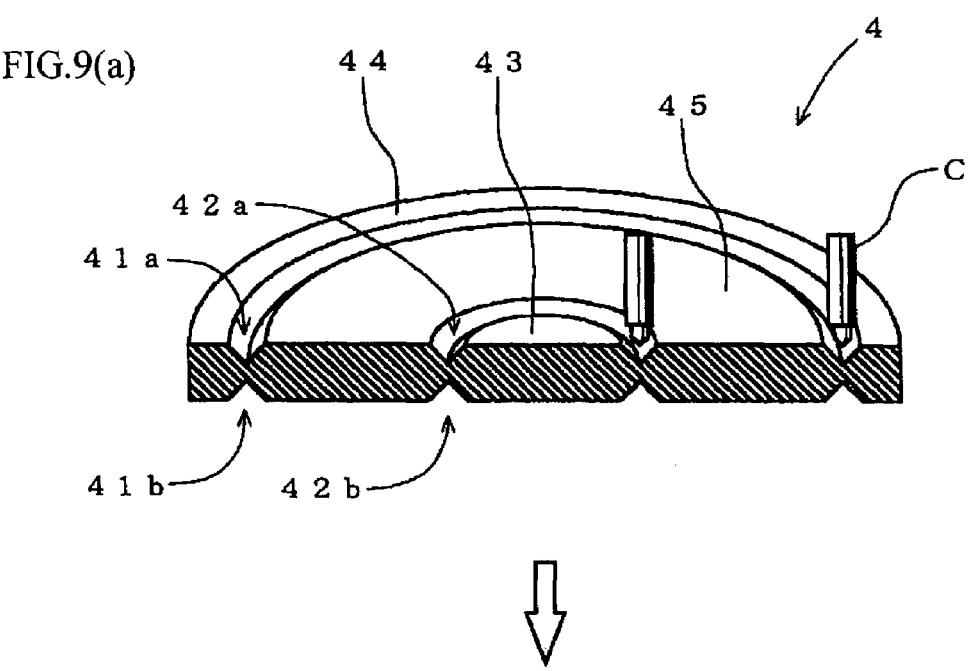
FIGS. 9 (a) and (b) are schematic views of inner/outer diameter scribe according to the third embodiment.
Figure 9B:
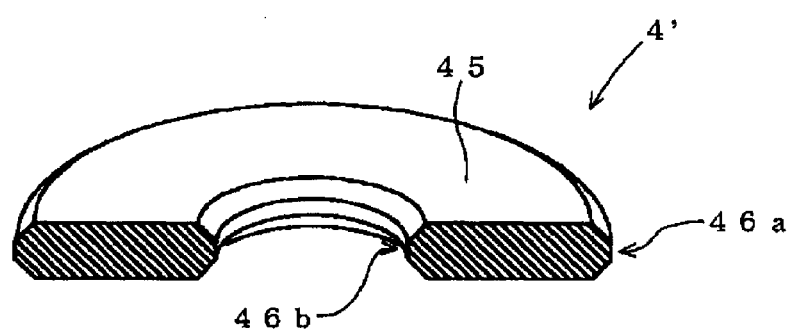

As shown in FIG. 9, inner and outer peripheral edge surfaces of the main body section 45 from which the central section 43 and the outer peripheral section 44 are cut off and removed by the diamond cutter C have the chamfered shape because of one of the tilted surfaces of each V-letter shape groove. The molded body formed by the metallic dies has a high dimension precision and a surface quality of the metallic dies is transferred to the surface of the molded body. Therefore, when the chamfered shape is formed as a result of the foregoing molding process, a quality substantially equal to or exceeding a surface obtained by polishing can be obtained. Accordingly, the inner/outer diameter high-precision processing step and the edge surface polishing process step (shown in FIG. 1), which were conventionally necessary, can be omitted in the manufacturing method according to the present embodiment. As a result, the manufacturing efficiency significantly improves.

Referring to FIG. 7 again, the first lapping treatment is carried out to a glass substrate precursor 4' in which only the main body section 45 is left as a result of the inner/outer diameter scribe. In the first lapping treatment, both surfaces of the glass substrate precursor 4' are polished and thereby preliminarily adjusted to a predetermined parallelism, flatness and thickness. There is no particular limitation to conditions for the lapping treatment, the treatment conditions employed in the conventional known manufacturing method can be adopted in the present embodiment. A grain size of an abrasive material used here is in the range of #600 to #2000, and the fixed abrasive grain (diamond pellet) or free abrasive grain (slurry such as alumina or silicon carbide) in the range of #800 to #2000 can be preferably used. Any conventional lapping device which is publicly known can be used as a lapping device in the present embodiment, a preferable example of which is the both-surface lapping device manufactured by HAMAI INDUSTRIES LTD. and SPEEDFAM CO., LTD.

Next, edge-surface straight parts 46a and 46b (shown in FIG. 9), which are the cut surfaces of the main body section 45, are polished. The cut surfaces of the main body section 45, from which the central section 43 and the outer peripheral section 44 are cut off and removed, are not formed in the molding process and therefore necessarily subjected to the polishing treatment. A method of the polishing treatment can be the same as the conventional known polishing method. For example, the cut surfaces of the main body part are polished by an abrasive material such as cerium oxide having an averaged first particle diameter of 2 μm or below so as to have a surface roughness (Ra) of 1 nm or below or preferably 0.5 nm or below, and a maximum surface roughness (Rmax) of 20 nm or below or preferably 10 nm or below. The surface roughness (Ra) and the maximum surface roughness (Rmax) are respectively the average value and maximum value based on JIS B0601.

Next, the both surfaces of the glass substrate precursor are lapped to correct a shape precision thereof (second lapping step). A final shape quality (parallelism, flatness and thickness) as the glass substrate is achieved, and the surface roughness and the maximum surface roughness adjustable in the following polishing step are also achieved. The conditions and the device used in the first lapping treatment described above can be preferably adopted and used in the second lapping treatment.

When the second lapping treatment is completed, the polishing treatment is carried out, that is to polish the both surfaces of the glass substrate precursor so that the smoothness thereof can be adjusted. The polishing treatment method employed here can be the same as the conventionally available method. For example, the method and the conditions exemplified in the polishing process of the edge-surface straight parts 46a and 46b (shown in FIG. 9) can be used. The conventional known polishing device can be used, an example of which is the both-surface polishing machine (manufactured by HAMAI INDUSTRIES LTD.)

As a final step, the polished glass substrate precursor is washed and examined. In the washing step, the glass substrate precursor is left in running water of normal temperature so as to remove any glass waste attached to the surface of the precursor. In the inspection step, it is examined if the parallelism, flatness, thickness, surface roughness, maximum surface roughness, concentricity, circularity, edge-part shape (roll-off), minute undulation and the like of the glass substrate precursor in respective desired ranges, and handled as a glass substrate to be shipped as an end product.

The manufacturing method described so far is the method of manufacturing the glass substrate having the central hole and the inner and outer peripheral edge surfaces of the chamfered shape. However, the manufacturing method according to the present embodiment can be applied to a glass substrate in which only one of the inner peripheral edge surface and the outer peripheral edge surface has the chamfered shape or a glass substrate in which the central hole is not provided and only the outer peripheral edge surface has the chamfered shape. More specifically, when the glass substrate in which only one of the inner and outer peripheral edge surfaces has the chamfered shape is produced, the protruding parts are formed only at positions of the upper and lower dies corresponding to the edge surface which is formed into the chamfered shape. When the glass substrate in which the central hole is not provided and only the outer peripheral edge surface has the chamfered shape is produced, the protruding parts are formed only at positions of the upper and the lower dies corresponding to the outer peripheral edge surface.

Figure 10:
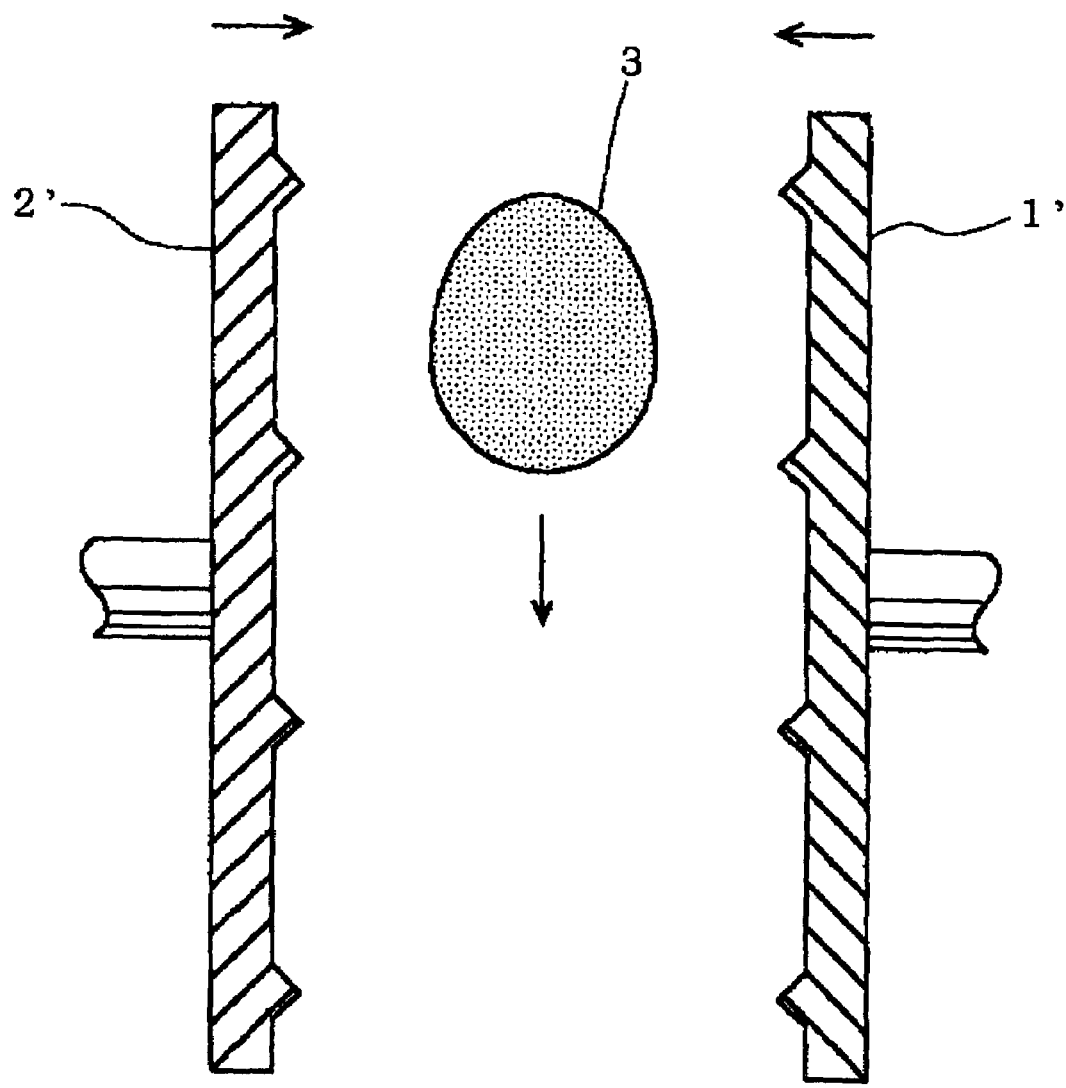
FIG. 10 is a schematic view of another example of the press molding according to the third embodiment.

According to the present embodiment, the press molding is carried out by vertically moving the metallic dies relative to each other. As an alternative constitution, as shown in FIG. 10, metallic dies 1' and 2' may be horizontally moved so that the dropped molten glass 3 is sandwiched therebetween while being dropped and thereby press-molded. In the foregoing case, it is necessary to move the metallic dies 1' and 2' with a high precision and at a high speed, which is rather difficult. However, the molten glass 3 can be advantageously pressmolded at a high temperature despite the disadvantage, and the glass substrate precursor of a reduced thickness can be thereby obtained. As a result, the polishing steps can be reduced or omitted.

Fourth Embodiment

Next, a manufacturing method according to a fourth embodiment of the present invention is described. The manufacturing method according to the fourth embodiment is different to the manufacturing method according to the third embodiment in that the protruding parts are formed only in one of the metallic dies to implement the press molding. In terms of the manufacturing efficiency, it is desirable to form the protruding parts at the opposite positions of the two metallic dies and form the V-letter shape grooves on the both surfaces of the glass substrate precursor as described in the manufacturing method according to the third embodiment. However, the protruding parts are unfavorably easily worn to shorten a life of the metallic dies due to a pressure repeatedly applied thereto from the molten glass at the time of the press molding. Therefore, in the manufacturing method according to the fourth embodiment, the protruding parts are formed only in one of the metallic dies, and one of the edge surfaces of the glass substrate is formed to have the chamfered shape by the press molding, while the other edge surface is formed to have the chamfered shape by the so-called reheating method. In the foregoing manner, the life of the metallic dies can be improved, and the manufacturing cost can be advantageously reduced.

Figure 12A:
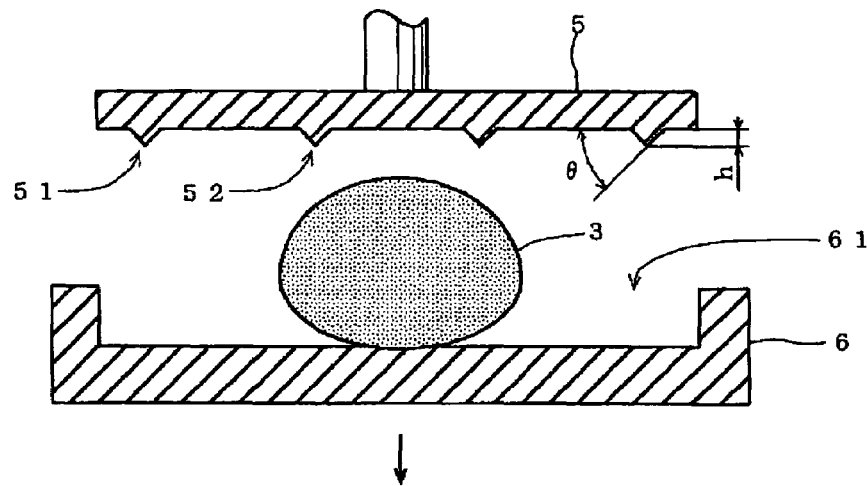
FIGS. 12 (a)-(c) are schematic views of press molding according to the fourth embodiment.
Figure 12B:
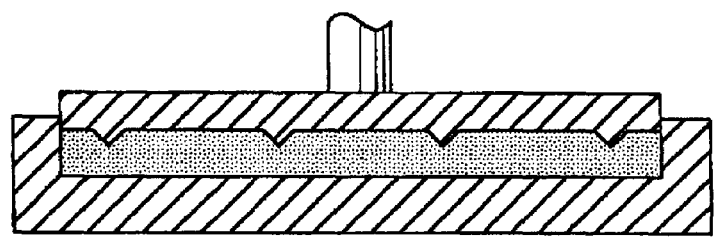
Figure 12C:
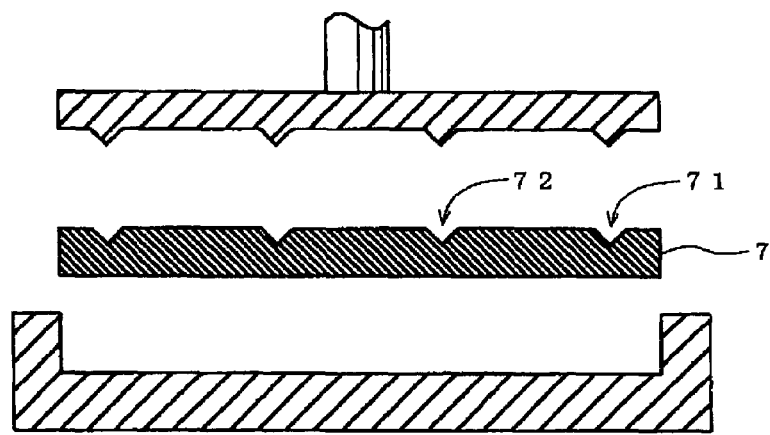

FIG. 11 is a flow chart of an example of a method of manufacturing a glass substrate in which a central hole is provided and inner and outer peripheral edge surfaces have the chamfered shape as in the manufacturing method according to the previous embodiment. Any step according to the present embodiment, which is also included in the beforementioned manufacturing method, is not described here again. The description below focuses on the steps different to the steps of the before-mentioned manufacturing method. As shown in FIG. 12, in the manufacturing method according to the present embodiment, a certain mount of the molten glass 3 is dropped or cast into a lower die 6 in which a bottom surface of a recessed portion 61 serves as the molding surface, and the molten glass 3 is pressed by an upper die 5 in which two protruding parts 51 and 52 having a wedge shape in section are concentrically formed to be thereby press-molded (press molding step). Thereby, the molten glass 3 is molded into a glass substrate precursor 7 in which two concentric V-letter shape grooves 71 and 72 are formed on an upper surface. A shape of the protruding parts 51 and 52 formed on the upper die 5 directly corresponds to the chamfered shape of the edge surface of the glass substrate. Therefore, in the same manner as in the before-mentioned manufacturing method, an angle of a tilting surface □ is preferably in the range of 30 to 60 degrees, and a height h is preferably in the range of ¼ to ⅓ relative to a thickness of the glass substrate.

Figure 13A:
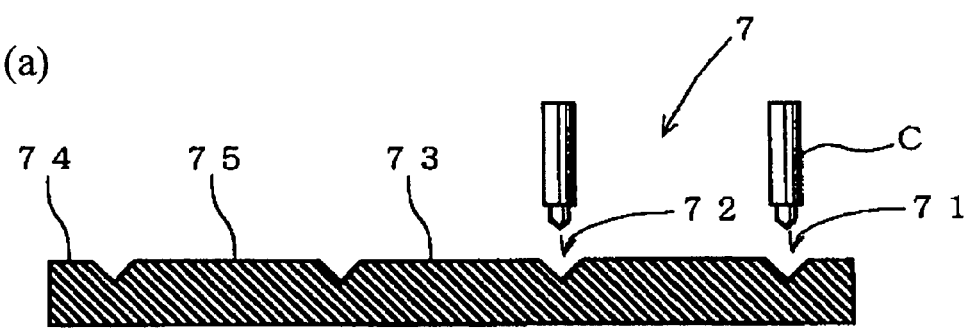
FIGS. 13 (a) and (b) are schematic views of inner/outer diameter scribe according to the fourth embodiment.
Figure 13B:
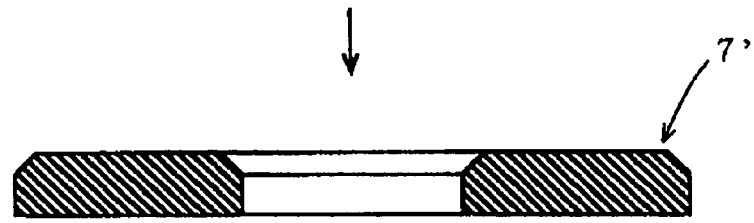

As shown in FIG. 11, the press-molded glass substrate precursor 7 is crystallized or annealed. As shown in FIG. 13, notches are formed along the V-letter shape grooves 71 and 72 by the diamond cuter C. Then, an impact is given to a central section 73 and an outer peripheral section 74 by an impact body (not shown) so that the central section 73 and the outer peripheral section 74 of the glass substrate precursor 7 are cut off and removed from a main body section 75 (inner/outer diameter scribe step in FIG. 11). As a result, an upper side of the edge surface of the main body section 75 of the glass substrate precursor 7 is formed into the chamfered shape, and a lower side of the edge surface has a substantially right angle. The first lapping treatment, which was described earlier, is similarly performed to the glass substrate precursor 7' in which only the main body section 75 is left.

Figures 14A, 14B, 14C:
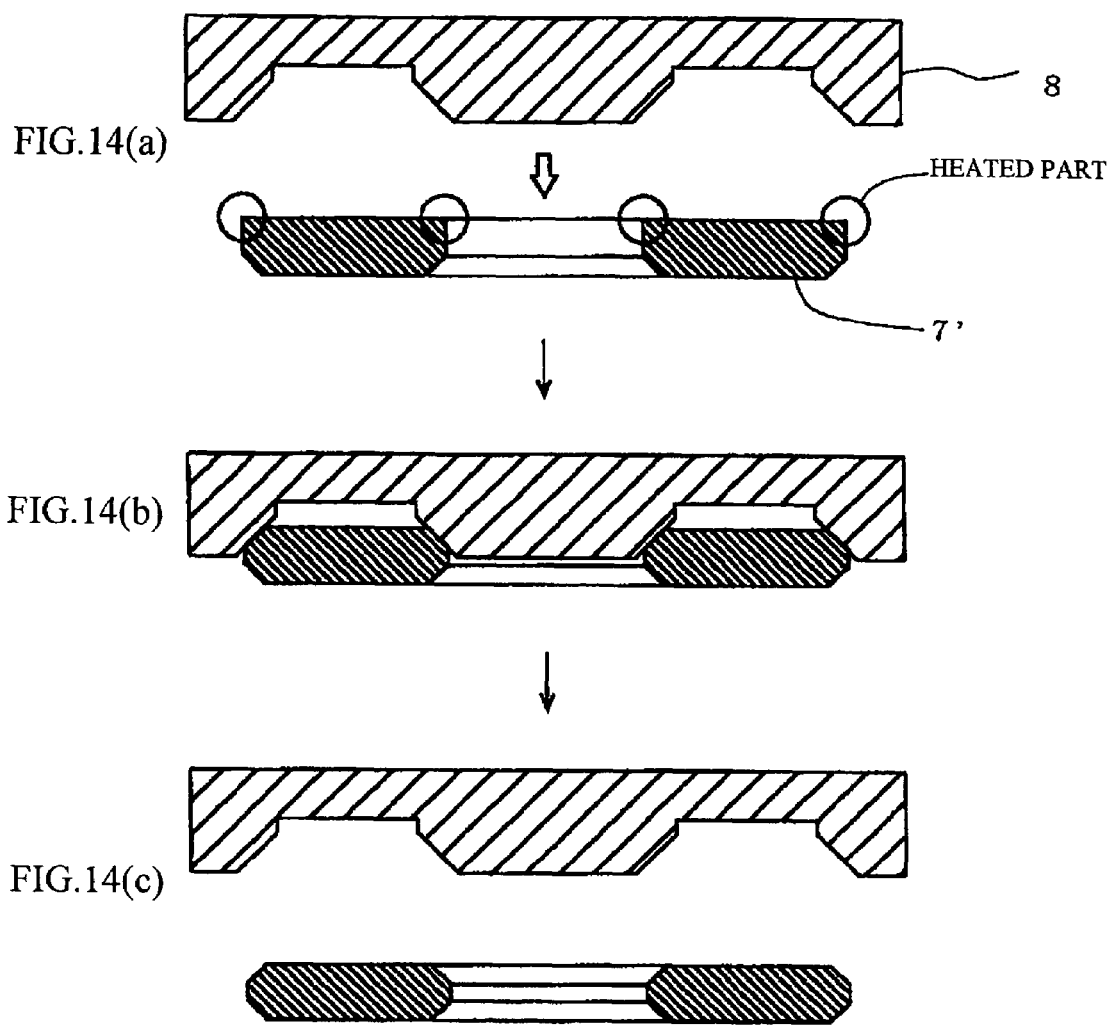
FIGS. 14 (a) - (c) are schematic views of chamfered by a reheating method according to the fourth embodiment.

Next, another edge surface not having the chamfered shape of a glass substrate precursor 7' is chamfered (one surface chamfered shape creating step of FIG. 11). To be more specific, as shown in FIG. 14, parts of the edge surface not having the chamfered shape in the glass substrate precursor 7' (circled parts in FIG. 14) are locally heated by a fire polish or a laser and pressed by a metallic die 8 in which a molding surface corresponding to the chamfered shape is provided in parts opposing to inner and outer peripheral edge surfaces of the glass substrate precursor 7' to be thereby formed into the chamfered shape. The chamfered shape formed in the present embodiment desirably has the same shape as the already formed chamfered shape in terms of convenience in handling.

Referring to FIG. 11 again, the respective manufacturing steps such as the second lapping step, polishing step, washing step and inspection step after the one surface chamfered shape creating step) are the same as in the previous embodiments. The manufacturing method described so far is the method of manufacturing the glass substrate having the central hole and the inner and outer peripheral edge surfaces of the chamfered shape. However, the manufacturing method according to the present embodiment can be applied to the glass substrate in which only one of the inner and the outer peripheral edge surfaces has the chamfered shape or a glass substrate in which the central hole is not provided and only the outer peripheral edge surface has the chamfered shape.

More specifically, when the glass substrate in which only one of the inner and the outer peripheral edge surfaces has the chamfered shape is produced, a metallic die in which the protruding parts are formed at positions opposing to the edge surface of the glass substrate to be formed into the chamfered shape is used as one of the press-molding metallic dies, and a metallic die in which a surface in contact with the edge surface of the glass substrate to be formed into the chamfered shape serves as a molding surface corresponding to the chamfered shape is used as the other pressing metallic die. When the glass substrate in which the central hole is not provided and only the outer peripheral edge surface has the chamfered shape is produced, a metallic die in which the protruding parts are formed at positions opposing to the outer peripheral edge surface of the glass substrate is used as one of the pressmolding metallic dies, and a metallic die in which a surface in contact with the outer peripheral edge surface of the glass substrate not having the chamfered shape serves as a molding surface corresponding to the chamfered shape is used as the other pressing metallic die.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A method of manufacturing a glass substrate for information recording medium, comprising the steps of:

forming a glass substrate precursor provided with a plurality of chamfered ridges, each chamfered ridge extending around the circumference of the glass substrate precursor and positioned axially consecutive on an outer peripheral surface of the glass substrate precursor and a through hole formed at a central part of the glass substrate precursor, said glass substrate precursor being formed by press-molding molten glass by a metallic die having a cylindrical body provided in a vertically standing manner at a central part of a bottom surface of a bottomed hole and having a molding surface corresponding to the plurality of chamfered ridges in an inner peripheral wall; and cutting the glass substrate precursor perpendicular to an axial direction between the chamfered ridges to divide the glass substrate precursor into respective glass substrates.

2. A method of manufacturing a glass substrate for information recording medium, comprising the steps of:

forming a molded body having a cylindrical shape and provided with a through hole at a central part thereof by press-molding molten glass by a metallic die in which a cylindrical body is provided in a vertically standing manner at a central part of a bottom surface of a hole having a cylindrical shape;

cutting the molded body perpendicular to an axial direction to be divided into preforms having a predetermined thickness; and molding the preform in a metallic die having a first molding surface having a chamfered shape in contact with an outer peripheral edge surface and a second molding surface having a chamfered shape at an inner peripheral edge surface of the preform.

3. A method of manufacturing a glass substrate for information recording medium in which an outer peripheral edge surface has a chamfered shape, said method comprising the steps of:

forming a glass substrate precursor circumferentially provided with a groove having a substantially V-letter shape on both surfaces thereof wherein a pair of metallic dies in which protruding parts corresponding to the chamfered shape and having a wedge shape in section are formed so as to circumferentially oppose to each other are used to press-mold molten glass; and cutting the glass substrate precursor at an apex of the substantially V-letter shaped groove to remove an outer peripheral section outside of the groove.

4. A method of manufacturing a glass substrate for information recording medium in which an inner peripheral edge surface has a chamfered shape, said method comprising the steps of:

forming a glass substrate precursor circumferentially provided with a groove having a substantially V-letter shape on both surfaces thereof wherein a pair of metallic dies in which protruding parts corresponding to the chamfered shape and having a wedge shape in section are formed so as to circumferentially oppose to each other are used to press-mold molten glass; and cutting the glass substrate precursor at an apex of the substantially V-letter shaped groove to remove a central section surrounded by the groove.

5. A method of manufacturing a glass substrate for information recording medium in which an outer peripheral edge surface and an inner peripheral edge surface has a chamfered shape, said method comprising the steps of:

forming a glass substrate precursor circumferentially provided with two concentric grooves having a substantially V-letter shape on both surfaces thereof wherein a pair of metallic dies in which two concentric protruding parts corresponding to the chamfered shape and having a wedge shape are formed so as to circumferentially oppose to each other are used to press-mold molten glass; and cutting the glass substrate precursor at an apex of the substantially V-letter shaped groove to remove an outer peripheral section outside of the outer groove and a central section surrounded by the inner groove.

6. A method of manufacturing a glass substrate for information recording medium in which an outer peripheral edge surface has a chamfered shape, said method comprising the steps of:

forming a glass substrate precursor circumferentially provided with a groove having a substantially V-letter shape on one surface of the glass substrate precursor wherein a pair of metallic dies in which protruding parts corresponding to the chamfered shape and having a wedge shape in section are formed in one of the metallic dies is used to press-mold molten glass;

cutting the glass substrate precursor at an apex of the substantially V-letter shaped groove to remove an outer peripheral portion so that one side of an outer peripheral edge surface has the chamfered shape;

heating an other side of the outer peripheral edge surface not having the chamfered shape; and pressing by a metallic die having a molding surface corresponding to the chamfered shape onto the glass substrate precursor to form a chamfered shape on the other side of the outer peripheral edge surface.

7. A method of manufacturing a glass substrate for information recording medium in which an inner peripheral edge surface has a chamfered shape, said method comprising the steps of:

forming a glass substrate precursor circumferentially provided with a groove having a substantially V-letter shape on one surface of the glass substrate precursor wherein a pair of metallic dies in which protruding parts corresponding to the chamfered shape and having a wedge shape formed in one of the metallic dies is used to press-mold molten glass;

cutting the glass substrate precursor at an apex of the substantially V-letter shaped groove to remove a central section so that one side of the inner peripheral edge surface of the glass substrate precursor has the chamfered shape;

heating an other side of the inner peripheral edge surface not having the chamfered shape; and pressing by a metallic die having a molding surface corresponding to the chamfered shape onto the glass substrate precursor to form a chamfered shape on the other side of the inner peripheral edge surface.

8. A method of manufacturing a glass substrate for information recording medium in which an outer peripheral edge surface and an inner peripheral edge surface has a chamfered shape, said method comprising the steps of:

forming a glass substrate precursor circumferentially provided with two concentric grooves having a substantially V-letter shape on one surface of the glass substrate precursor wherein a pair of metallic dies in which two concentric protruding parts corresponding to the chamfered shape and having a wedge shape formed in one of the metallic dies are used to press-mold molten glass;

cutting glass substrate precursor at an apex of the substantially V-letter shaped grooves to remove an outer portion and a central section so that one side of an outer and an inner peripheral edge surfaces of the glass substrate precursor has the chamfered shape;

heating an other side of the outer and inner peripheral edge surfaces not having the chamfered shape; and pressing by a metallic die having a molding surface corresponding to the chamfered shape onto the glass substrate precursor to form a chamfered shape on the other side of the outer and inner peripheral edge surfaces.

* * * * *